US012450089B1

United States Patent
Busey et al.

(10) Patent No.: US 12,450,089 B1
(45) Date of Patent: Oct. 21, 2025

(54) SYSTEMS AND METHODS FOR PARALLEL PROCESSING OF COMPUTATIONAL MODULES OF A COMPUTATIONAL WORKFLOW

(71) Applicant: Form Bio Inc., Austin, TX (US)

(72) Inventors: Andrew Busey, Austin, TX (US); Joseph Charles Nipko, Boulder City, NV (US); Brandi Lynn Cantarel, Richardson, TX (US); Douglas James Daniels, Jr., Austin, TX (US)

(73) Assignee: Form Bio Inc., Austin, TX (US)

( * ) Notice: Subject to any disclaimer, the term of this patent is extended or adjusted under 35 U.S.C. 154(b) by 791 days.

(21) Appl. No.: 17/734,847

(22) Filed: May 2, 2022

(51) Int. Cl.
| | | |
|---|---|---|
| *G16B 45/00* | (2019.01) | |
| *G06F 9/48* | (2006.01) | |
| *G06F 9/50* | (2006.01) | |
| *G16B 50/00* | (2019.01) | |

(52) U.S. Cl.
CPC .......... *G06F 9/4881* (2013.01); *G06F 9/5066* (2013.01); *G16B 45/00* (2019.02); *G16B 50/00* (2019.02)

(58) Field of Classification Search
CPC ..... G06F 9/5072; G06F 9/3885; G06Q 10/00; G06Q 10/06; G06Q 10/063; G06Q 10/0633; G16B 45/00; G16B 50/00
See application file for complete search history.

(56) References Cited

U.S. PATENT DOCUMENTS

| | | | | |
|---|---|---|---|---|
| 2004/0143403 | A1* | 7/2004 | Brandon | G16B 25/10 |
| | | | | 702/19 |
| 2006/0064415 | A1* | 3/2006 | Guyon | G16B 40/10 |
| 2008/0307194 | A1* | 12/2008 | Archer | G16B 50/30 |
| | | | | 712/E9.005 |
| 2008/0307195 | A1* | 12/2008 | Archer | G06F 9/30032 |
| | | | | 712/E9.005 |
| 2014/0325587 | A1* | 10/2014 | Nilsson | G16B 50/30 |
| | | | | 726/1 |
| 2016/0034809 | A1* | 2/2016 | Trenholm | H04L 67/01 |
| | | | | 706/20 |
| 2017/0046481 | A1* | 2/2017 | Wang | G16B 50/10 |
| 2018/0189444 | A1* | 7/2018 | van Rooyen | G16B 50/30 |
| 2019/0196672 | A1* | 6/2019 | Mikheev | G06Q 10/06 |
| 2020/0004604 | A1* | 1/2020 | Lavoie | G06F 16/907 |
| 2020/0176084 | A1* | 6/2020 | Fitch | G16B 30/10 |
| 2020/0184376 | A1* | 6/2020 | Parameswaran | G06N 20/00 |
| 2021/0280275 | A1* | 9/2021 | Akerman | G16H 50/30 |
| 2022/0137978 | A1* | 5/2022 | Sodagar | G06F 9/3851 |
| | | | | 712/220 |

(Continued)

Primary Examiner — Kenneth Tang
(74) Attorney, Agent, or Firm — Esplin & Associates, PC (57) ABSTRACT

System and method for parallel processing of computational modules of a computational workflow. Exemplary implementations may: receive user entry or selection of an input information set; configure a computational workflow to process the input information set; process the input information set with the computational workflow to generate workflow output, such that the processing the input information set includes processing the input information set at a first workflow stage to generate a first stage output, and processing the first stage output at a second workflow stage to generate second stage output; and output the workflow output including separate sets of analogous output information presented as multiple prospective final outputs.

20 Claims, 4 Drawing Sheets

(56) References Cited

U.S. PATENT DOCUMENTS

2022/0243257 A1\* 8/2022 Kwok ................... C12Q 1/6837
2023/0114581 A1\* 4/2023 Bell ....................... G16B 25/10
                                                          702/19
2024/0354607 A1\* 10/2024 Wong .................... G06N 20/00

\* cited by examiner

SYSTEMS AND METHODS FOR PARALLEL PROCESSING OF COMPUTATIONAL MODULES OF A COMPUTATIONAL WORKFLOW

FIELD OF THE DISCLOSURE

The present disclosure relates to systems and methods for parallel processing of computational modules of a computational workflow.

BACKGROUND

Methods of processing data in parallel are known (e.g., parallel computing using multiple processors). Bioinformatics programs for converting between file types and/or formats are known.

SUMMARY

Attempting to convert biological data (e.g., genomic information) between formats and/or file types may result in numerous and varying sets of outputs. One or more computational modules (i.e., bioinformatics programs) used to process and/or convert input sets of biological data (e.g., a marker of interest including DNA and RNA sequences, mass spectrometry, biological image data from microscopy, MRI, CT, radiology, etc.) may be configured in a computational workflow in order to achieve a desired output. The computational workflow may include connected workflow stages having a number of computational modules for processing input. Individual outputs of a previous workflow stage may be provided as input into individual computational modules of a subsequent workflow stage, resulting in an exponential number of outputs, an exponential amount of required computational power, and/or computing time for the computational workflow. One of more aspects disclosed herein propose solutions for increasing efficiency of processing information using computational workflows and improvements for analyzing results (i.e., outputs) of the computational workflows.

One or more aspects of the present disclosure include a system for parallel processing of computational modules of a computational workflow. The system may include electronic storage, one or more hardware processors configured by machine-readable instructions and/or other components. Executing the machine-readable instructions may cause the one or more hardware processors to facilitate parallel processing of computational modules of a computational workflow. The machine-readable instructions may include one or more computer program components. The one or more computer program components may include one or more of an input component, a workflow component, an output component, and/or other components.

The electronic storage may be configured to store computational modules and/or other information. Individual ones of the computational modules may define separate sets of computational operations to perform on module inputs to the computational modules to produce module outputs. The different computational modules may have different input format requirements for module inputs. The separate sets of computational operations defined by the different computational modules may produce module outputs having different output formats. By way of non-limiting example, the computational modules may include a first set of computational modules that are functionally analogous to each other, a second set of computational modules that are functionally analogous to each other, and/or other sets of computational modules. The first set of computational modules may include a first computational module, a second computational module, and/or other computational modules. The second set of computational modules may include a third computational module, a fourth computational module, and/or other computational modules.

The input component may be configured to receive user entry and/or selection of an input information set and/or other information.

The workflow component may be configured to configure a computational workflow to process the input information set and/or other information. By way of non-limiting illustration, the computational workflow may have at least a first workflow stage, a second workflow stage, and/or other workflow stages. The second workflow stage may be subsequent to the first workflow stage. The first workflow stage may include the first computational module, the second computational module, and/or other computational modules. The second workflow stage may include the third computational module, the fourth computational module, and/or other computational modules.

The workflow component may be configured to process the input information set with the computational workflow to generate workflow output. At the first workflow stage, the workflow component may process the input information set to generate a first stage output, and/or other outputs. Processing may include processing providing the input information set, information derived from the input information set, and/or other information to both the first computational module and the second computational module as module input. The first stage output may include a first module output generated by the first computational module, second module output generated by the second computational module, and/or other outputs.

At the second workflow stage, the workflow component may be configured to process the first stage output, information derived from the first stage output, and/or other information to generate a second stage output. Processing at the second workflow stage may include providing the first module output, information derived from the first module output, and/or other information as module input to the third computational module and the fourth computational module. The second stage output may include a third module output generated by the third computational module, a fourth module output generated by the fourth computational module and/or other outputs. Processing at the second workflow stage may include providing the second module output, information derived from the second module output, and/or other information as module input to the third computational module and the fourth computational module. The second stage output may further include a fifth module output generated by the third computational module, a sixth module output generated by the fourth computational module, and/or other outputs.

The workflow output may include separate sets of analogous output information, and/or other information. The separate sets of analogous output may reflect the parallel nature of computation provided by the computational workflow. The separate sets of analogous output information may include a first set of output information, a second set of output information, a third set of output information, a fourth set of output information, and/or other information. The first set of output information may include the third module output, and/or information derived therefrom. The second set of output information may include the fourth module output, and/or information derived therefrom. The third set of output information may include the fifth module output, and/or information derived therefrom. The fourth set of output information including the sixth module output, and/or information derived therefrom.

The output component may be configured to output the workflow output. The separate sets of analogous output information may be presented as multiple prospective final outputs for the processing of the input information set in accordance with the computational workflow.

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
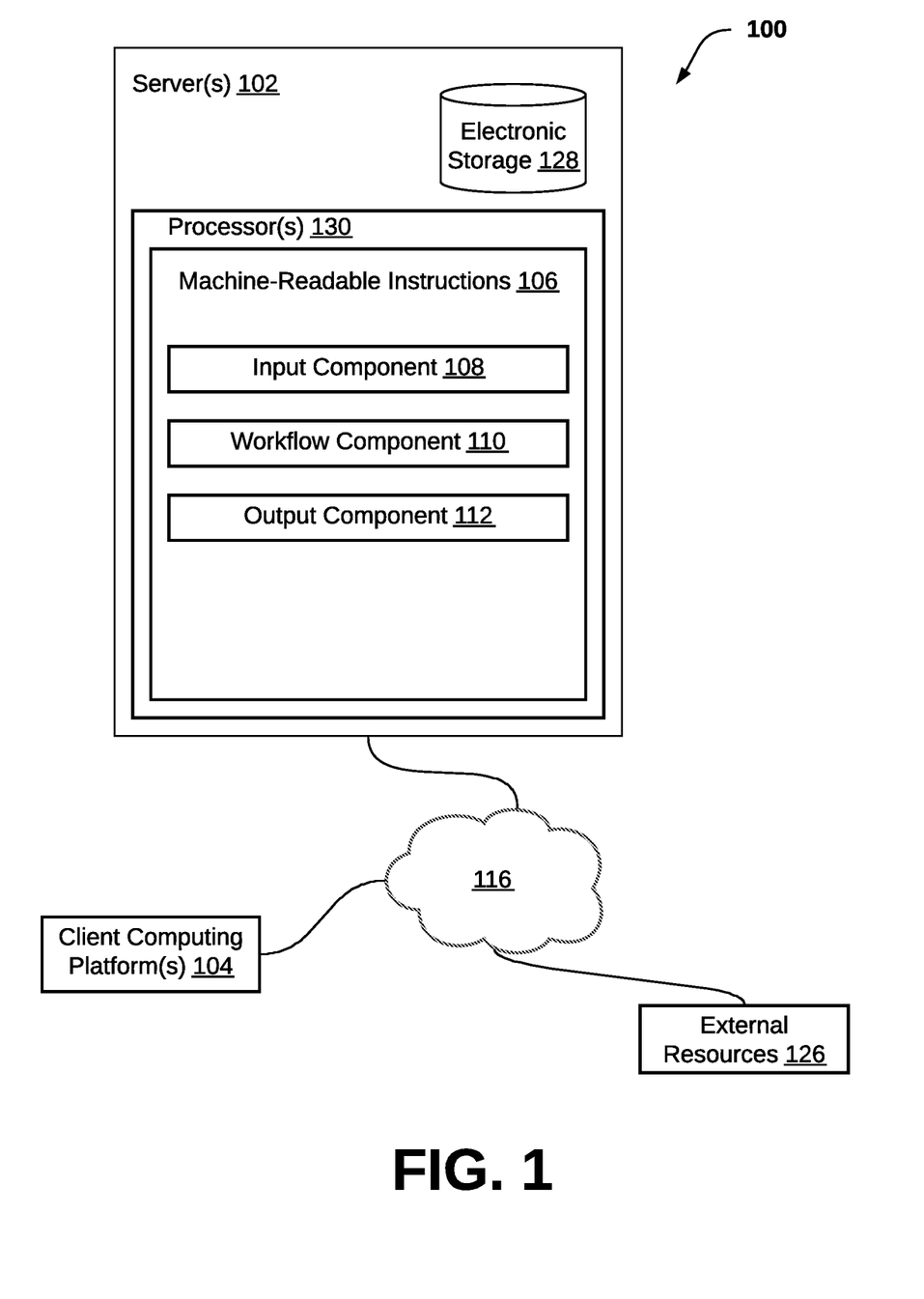
FIG. 1 illustrates a system for parallel processing of computational modules of a computational workflow, in accordance with one or more implementations.

FIG. 1 illustrates a system 100 configured for parallel processing of computational modules of a computational workflow, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of input component 108, workflow component 110, output component 112, and/or other instruction components.

Electronic storage 128 may be configured to store computational modules, and/or other information. Individual ones of the computational modules may define separate sets of computational operations to perform on module inputs to the computational modules to produces module outputs. In some implementations, computational modules of a set of computational modules may be functionally analogous. Computational modules that are functionally analogous may produce outputs having the same output format, and/or outputs that share other characteristics. Computational modules that are functionally analogous may define separate sets of computational operations that perform the same calculations in a different order, perform the same functions using different calculations, and/or other variations.

In some implementations, outputs produced by computational modules that are functionally analogous may also be functionally analogous. By way of non-limiting illustration, a first output including a first genomic sequence may be produced by a first computational module and a second output including a second genomic sequence may be produced by a second computational module. The first genomic sequence and the second genomic sequence may be functionally analogous by virtue of the first computational module and the second computational module being functionally analogous. The first genomic sequence and the second genomic sequence being functionally analogous may indicate the first genomic sequence and the second genomic sequence result in production of the same compounds during a manufacturing process (e.g., protein synthesis).

The different computational modules may have different input format requirements for module inputs. Inputs not satisfying the input format requirements of a computational module may not be capable of being processed by the computational module. Input format requirements may include a required file format (e.g., FASTQ, FASTA, BAM, etc.), a required data format, required file information (e.g., indexing information, quality score information, etc.), and/or other requirements. The separate sets of computational operations defined by the different computational modules may produce module outputs having different output formats. In some implementations, the computational module may be configured to convert the input information set from the input format to the output format. An input of a computational module may include the same or similar information in a different format (i.e. data format, file format, etc.) as the output of the computational module. By way of non-limiting example, a computational module may define separate sets of computational operations for converting an input file of a BAN format to produce an output of a FASTA format.

By way of non-limiting illustration, the computational module may include a first set of computational modules that are functionally analogous to each other and a second set of computational modules that are functionally analogous to each other. The first set of computational modules may include a first computational module and a second computational module. The second set of computational modules may include a third computational module and a fourth computational module.

Input component 108 may be configured to receive user entry and/or selection of an input information set and/or other information. User entry may include a user uploading one or more electronic files via one or more client computing platform(s) 104 associated with the user. The one or more electronic files may include genomic information (e.g., genomic sequences) and/or other information. The one or more electronic files be a FASTA file, FASTQ file, BAM file, SAM file, BAS file, and/or other file types. The input information set may include indexing information, quality score information, and/or other information pertaining to the genomic information included in the input information set. In some implementations, the input information set may be obtained from an external database via one or more network(s) 116. Input information sets obtained from an external database may be reconfigured (i.e., reformatted) by input component 108 in order to facilitate compatibility with system 100. In some implementations, the user may select an input information set from multiple provided input information sets. By way of non-limiting example, the user may access a user interface via client computing platform(s) 104. The user interface may show one or more user interface elements associated with one or more individual input information sets capable of being selected. The user interface elements may include drop-down menus, widgets, buttons, tabs, and/or other types of user interface elements. Selection and/or entry of an input information set may facilitate processing of the input information set in accordance with one or more computational workflows.

In some implementations, input component 102 may be configured to receive user input indicating preference information associated with the workflow output, computational workflow, and/or other information. Preference information may define criteria to be satisfied for the outputs of the computational workflow. For example, prospective final outputs of the computational workflow that satisfy the criteria of the preference information may be provided to the user as final output. Prospective final outputs that do not satisfy the criteria of the preference information may not be provided to the user as final output and/or flagged for failure to satisfy the criteria. Criteria may include one or more thresholds for values and/or features associated with the prospective final outputs of the computational workflow. For example, criteria may include a threshold for a quality score (i.e., a confidence score) associated with a prospective final output of the computational workflow. In some implementations, user entry and/or selection may indicate a computational workflow to be used to process the input information set.

Workflow component 110 may be configured to configure a computational workflow to process the input information set and/or other information. In some implementations, the computational workflow may be configured according to user input specifying information associated with computational workflow. For example, user input may indicate an order of workflow stages, one or more computational modules for individual ones of workflow stages, an order for the one or more computational modules, and/or other information. In some implementations, a computational workflow may be configured in accordance with one or more of a workflow input format and/or a workflow output format specified by the user. For example, user input may specify a first workflow input format and a first workflow output format. A first computational workflow may be configured such that the input format of the first computational workflow is the first workflow input format, and the output format of the first computational workflow is the first workflow output format. In some implementations, a computational workflow may be configured according to one or more workflow definitions and/or other information. Workflow definitions may be stored in electronic storage 128, external resources 126, and/or obtained via networks 116. A workflow definition may define one or more sets of computational modules, workflow stages, and/or other information associated with a computational workflow. The workflow definition may define input format(s) and/or output format(s) for the computational workflow and/or individual computational modules included in the computational workflow.

The computational workflow may have at least a first workflow stage, a second workflow stage, and/or other workflow stages. Workflow stages may be defined by workflow input format(s), workflow output format(s), a set of computational modules, and/or other workflow components. For example, a workflow stage may include one or more computational modules. The one or more computational modules may include the same input format requirements and/or produce outputs of the same format. The one or more computational modules of the workflow stage may be functionally analogous. The first workflow stage may include the first computational module, the second computational module, and/or other computational modules. The second workflow stage may include the third computational module, the fourth computational module, and/or other computational modules.

The computational workflow may be defined by an order of workflow stages. The order of workflow stages may indicate a processing order for the input information set by the computational modules of the individual workflow stages. For example, the second workflow stage may be subsequent to the first workflow stage. Based on the order of the workflow stages, the input information set may be processed by the computational modules of the second workflow stage subsequent to the input information set being processed by the computational modules of the first workflow stage. In some implementations, the order of workflow stages may determine input/output connections between workflow stages. For example, the second workflow stage being subsequent to the first workflow stage may indicate outputs of the first workflow stage (and/or information derived from the outputs of the first workflow stage) to be provided as input to the second workflow stage.

In some implementations, configuration of the computational workflow(s) to process the input information set may be based on preference information, and/or other information. User input specifying preference information may indicate one or more computational modules, one or more orders of computations modules, and/or other information related to computational workflows. For example, preference information may indicate one or more sets of computational modules, an order of the one or more sets of computational modules, and/or other information. A computational workflow may be configured with workflow stages in accordance with the indicated order of the sets of computational modules.

Workflow component 110 may be configured to process the input information set with the computational workflow to generate workflow output. Processing the input information set with the computational workflow may include performing the separate sets of computational operations of the computational modules in accordance with the order of the workflow stages. Performing an individual set of computational operations on a module input may include transforming, converting, reformatting, and/or performing other modifications to the module input to produce a module output. In some implementations individual workflow stages may correspond with individual sets of computational modules. For example, the first workflow stage may correspond with the first set of computational modules, the second workflow stage may correspond with the second set of computational modules, and so on and so forth.

At the first workflow stage, workflow component 110 may be configured to process the input information set to generate a first stage output, and/or other outputs. Processing the input information set may include providing the input information set, information derived from the input information set, and/or other information to the first computational module and the second computational module as module input. The module input to the first computational module may be the same as the module input to the second computational module. A first set of operations defined by the first computational module may be performed on the module input to produce a first module output and/or other outputs. A second set of operations defined by the second computational module may be performed on the module input to produce a second module output and/or other outputs. The first module output and the second module output may have the same output format and/or share other characteristics. The first stage output may include the first module output generated by the first computational module, the second module output generated by the second computational module, and/or other module outputs generated by other computational modules of the first set of computational modules. Performing the first set of operations on the module input and performing the second set of operations on the module input may happen simultaneously or near simultaneously. In other words, the first module output and the second module output may be generated simultaneously or near simultaneously.

In some implementations, the second workflow stage may be initiated responsive to completion of processing of the input information set at the first workflow stage, generation of the first stage output and/or other events. At the second workflow stage, workflow component 110 may be configured to process the first stage output, information derived from the first stage output, and/or other information to generate a second stage output. Information derived from the first stage output may be generated by modifying the first module output and/or the second module output to satisfy the input format requirements for module inputs of the second set of computational modules. In some implementations, the information derived from the first stage output may be generated by aggregating the first module output and/or the second module output to produce module input for computational modules of the second set of computational modules.

At the second workflow stage, workflow component 110 may provide the first module output, information derived from the first module output, and/or other information as module input to the third computational module and the fourth computational module. A third set of computational operations defined by the third computational module may be performed on the module input (i.e., the first module output and/or information derived from the first module output) to produce a third module output and/or other outputs. A fourth set of computational operations defined by the fourth computational module may be performed on the module input (i.e., the first module output and/or information derived from the first module output) to produce a fourth module output and/or other outputs. At the second workflow stage, workflow component 110 may provide the second module output, information derived from the second module output, and/or other information as module input to the third computational module and the fourth computational module. The third set of computational operations may be performed on the module input (i.e., the second module output and/or information derived from the second module output) to produce a fifth module output and/or other outputs. The fourth set of computational operations may be performed on the module input (i.e., the second module output and/or information derived from the second module output) to produce a sixth module output and/or other outputs. In some implementations, performing one or more of the third set of computational operations on the first module output, the fourth set of computational operations on the first module output, the third set of computational operations on the second module output, and/or the fourth set of computational operations on the second module output may happen simultaneously or near simultaneously. In other words, one or more of the third module output, fourth module output, fifth module output, and/or sixth module output may be generated simultaneously and/or near simultaneously.

The second stage output may include the third module output, fourth module output, fifth module output, sixth module output, and/or other outputs. The third module output, fourth module output, fifth module output, and/or sixth module output may be functionally analogous and/or share other characteristics. In some implementations, the second stage output may be provided as module input for a third set of computational modules corresponding to a third workflow stage and/or exported as a second input information set for another computational workflow. The second stage output may be exported and/or provided as workflow output for the computational workflow.

The workflow output may include separate sets of analogous output information, and/or other information. The separate sets of analogous output may reflect the parallel (i.e., simultaneous) nature of computation provided by the computational workflow. For example, individual computational modules of a set of computational modules corresponding to a workflow stage may perform sets of operations for multiple module inputs in parallel. The separate sets of analogous output information may include a first set of output information, a second set of output information, a third set of output information, a fourth set of output information, and/or other sets of output information. The first set of output information may include the third module output, and/or information derived therefrom. The second set of output information may include the fourth module output, and/or information derived therefrom. The third set of output information may include the fifth module output, and/or information derived therefrom. The fourth set of output information including the sixth module output, and/or information derived therefrom. Individual ones of separate sets of analogous output information may include information from individual module outputs from the final workflow stage (e.g., the second workflow stage) and/or other workflow stages of the computational workflow.

In some implementations, individual ones of the separate sets of analogous output information may include pathway information and/or other information. The pathway information may specify the computational modules defining the sets of computational operations performed to produce the output included in the individual set of analogous output information. The pathway information may further specify an order of computational modules corresponding to the output. For example, the first set of analogous output information may include pathway information specifying the first computational module followed by the third computational module. The second set of analogous output information may include pathway information specifying the second computational module followed by the third computational module. The third set of analogous output information may include pathway information specifying the first computational module followed by the fourth computational module. The fourth set of analogous output information may include the second computational module followed by the fourth computational module. In some implementations, pathway information may be specific and/or unique to the individual set of analogous output information.

Output component 112 may be configured to output the workflow output and/or other information. The separate sets of analogous output information may be presented as multiple prospective final outputs for the processing of the input information set in accordance with the computational workflow. The multiple prospective final outputs may be presented to the user in a list, graph, and/or other type of visual summary. The visual summary of the multiple prospective final outputs may include individual visual elements corresponding to individual ones of the multiple prospective final outputs and/or be capable of being selected. Selection of one or more of the multiple prospective final outputs included in the visual summary may facilitate providing the selected ones of the multiple prospective final outputs as final outputs for the computational workflow. Final outputs may be exported and/or otherwise used by the user. Input component 108 may be configured to receive user input specifying selection of one or more of the multiple prospective final outputs and/or other types of user input.

In some implementations, output component 112 may be configured to analyze the separate sets of analogous output information and/or other information. Analyzing individual ones of the separate sets of analogous output information may include determining values (e.g., numerical values) for individual features (i.e., properties, characteristics, traits), instances of phenomena present in the separate sets of analogous output information, and/or other information. Values may be numerical values, Boolean values, string values, and/or other types of values. Values for features may include a quality score (i.e., confidence score), an accuracy score, a precision score, and/or other information. In some implementations, the determined values for individual ones of the separate sets of analogous output information may be based on and/or relative to the other separate sets of analogous output information. For example, output component 112 may be configured to identify a median set of analogous output information. Values (and/or scores) for features for other ones of the separate sets of analogous output information may be based on and/or relative to values for features of the median set of analogous output information. The features for which values are determined may be specified by user input (e.g., included in preference information). Analyzing the workflow output may include determining distribution scores for individual ones of the separate sets of analogous output information and/or the multiple prospective final outputs. The distribution scores may indicate a relationship between the set of analogous output information associated with the distribution score and other sets of analogous output information.

In some implementations, the multiple prospective final outputs may be sorted and/or classified into clusters (i.e., groups) of outputs. Individual ones of the multiple prospective final outputs may be classified into one or more clusters of outputs based on one or more of pathway information, values for features, and/or other information associated with the individual prospective final output. For example, a first cluster of outputs may include one or more prospective final outputs having quality scores within a first range, and a second cluster of outputs may include one or more prospective final outputs having quality scores within a second range, the first range being different than the second range.

In some implementations, multiple user inputs specifying selection of final outputs for multiple computational workflows. The multiple computational workflows and the final outputs (specified by user input) may be provided as input/output pairs to generate a machine learning model and/or other models. Output component 112 may be configured to train the machine learning model based on multiple sets of input/output pairs to generate a trained machine learning model. The training process may continue until the model achieves a desired level of accuracy on training data. The training data may include the input/output pairs. The trained machine learning model may be capable of selecting a final output from a set of multiple prospective final outputs of a computational workflow. In some implementations, the selection by the machine learning model may be based on preference information and/or other information. The trained machine learning model may be stored in electronic storage 128 and/or other components of system 100.

In some implementations, output component 112 may be configured to obtain the trained machine learning model from electronic storage 128 and/or execute selection of at least one of the multiple prospective final outputs as the final output of the computational workflow using the trained machine learning model. The trained machine learning model may select one or more of the multiple prospective final outputs as final output based on one or more of preference information obtained from the user, pathway information, determined values for features, and/or other information. The selection of one or more of the prospective final outputs may be based on the clusters of outputs corresponding to individual ones of the prospective final outputs.

In some implementations, output component 112 may be configured to present via a user interface, a graphical summary of information characterizing the multiple prospective final outputs. In some implementations, the graphical summary may present the multiple prospective final outputs in an ordered list. The ordered list may be based on one or more of distribution scores, values for features, compliance with preference information, and/or other information. In some implementations, the graphical summary may present the multiple prospective final outputs in accordance with the determined clusters of outputs for individual ones of the multiple prospective final outputs, and/or other information. The graphical summary may include a line graph, a plot graph (i.e., scatterplot), and/or other types of graphical summaries. In some implementations, input component 108 may be configured to receive user input specifying one or more components of the graphical summary. Components of the graphical summary may include type of graphical summary, number of axes, values represented by axes, ranges of values, and/or other components.

Figure 3:
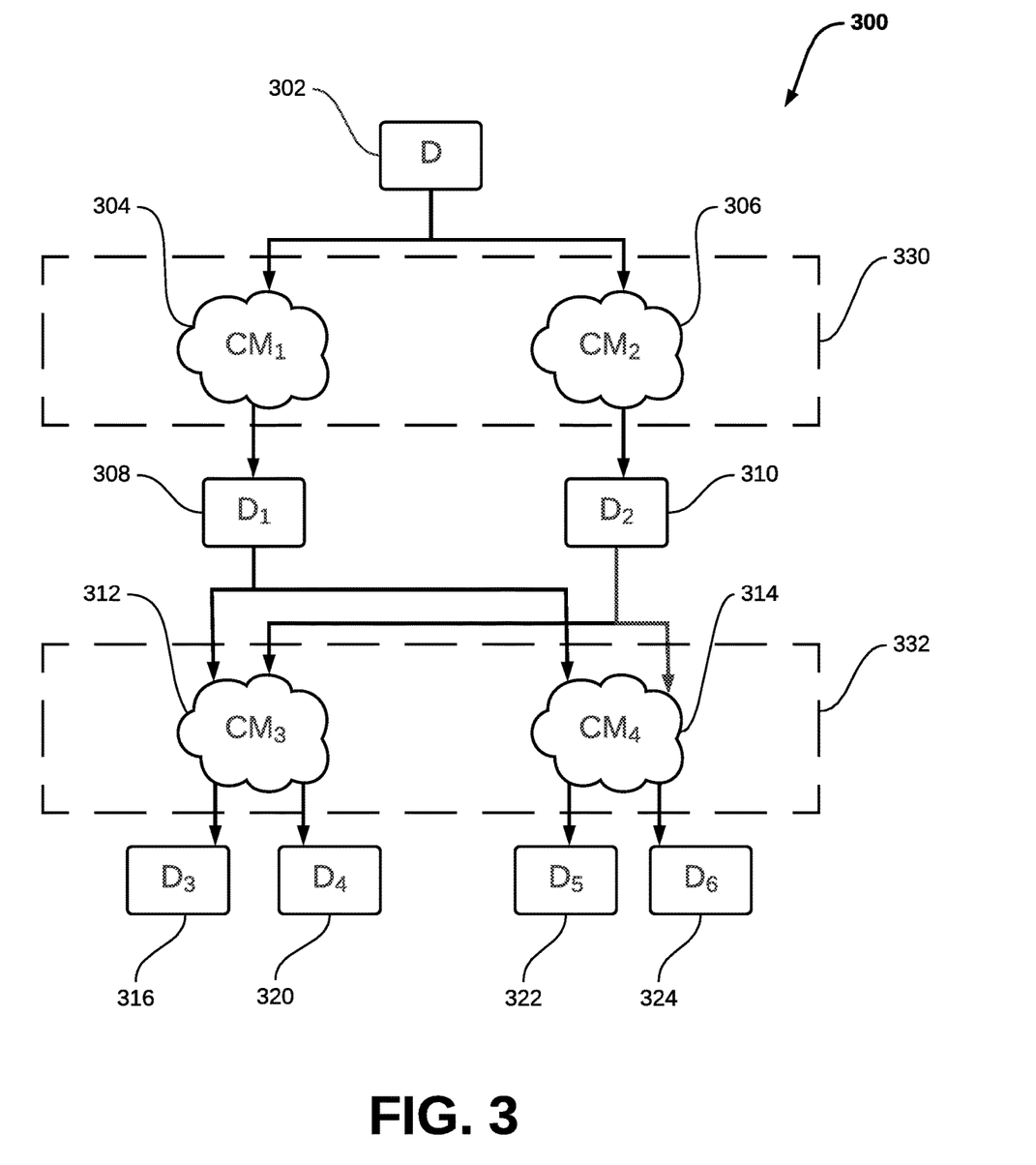
FIG. 3 illustrates an exemplary implementation of the system configured for parallel processing of computational modules of a computational workflow, in accordance with one or more implementations.

FIG. 3 illustrates an exemplary implementation of a system configured for parallel processing of computational modules of a computational workflow, in accordance with one or more implementations. The computational workflow may include a first workflow stage 330 (represented by a dashed rectangle), a second workflow stage 332 (represented by a dashed rectangle), and/or other workflow stages. The second workflow stage 332 may be subsequent to the first workflow stage 330. The first workflow stage 330 may include one or more of a first computational module 304, a second computational module 306, and/or other computational modules. In some implementations first computational module 304 and second computational module 306 may have the same input format requirement(s). First computational module 304 may define a first set of operations to be performed on input to first computational module 304. Second computational module 306 may define a second set of operations to be performed n input to second computational module 306. The second workflow stage 332 may include a third computational module 312, a fourth computational module 314, and/or other computational module. In some implementations, third computational module 312 and fourth computational module 314 may have the same input format requirement(s). Third computational module 312 may define a third set of operations to be performed on input to third computational module 312. Fourth computational module 312 may define a fourth set of operations to be performed on input to fourth computational module 314.

Input information set 302 (labelled as 'D') may be obtained and/or selected by a user. In some implementations, input information set 302 may satisfy the input format requirements of first computational module 304 and/or second computational module 306. Input information set 302 may be provided as module input for first workflow stage 330 for processing to produce first stage output. Processing input information set 302 may include providing the input information set 302 as module input to the first computational module 304 and the second computational module 306. At the first workflow stage, the first set of operations and the second set of operations may be performed on the input information set 302 and/or information derived from input information set 302. Performing the first set of operations on input information set 302 (i.e., processing input information set 302 through the first computational module 304) may produce first module output 308 (labelled as 'D$_1$'). Performing the second set of operations on input information set 302 may produce second module output 310 (labelled as 'D$_2$'). In some implementations, first module output 308 and/or second module output 310 may be generated simultaneously and/or near simultaneously.

Processing of input information set 302 at the first workflow stage 330 may generate first stage output. First stage output may include first module output 308, second module output 310, and/or other module outputs. In some implementations, the first module output 308 and the second module output 310 may satisfy the input requirements of the third computational module 312 and/or the fourth computational module 314. The first stage output may be provided as module input to the computational modules of the second workflow stage 332. At the second workflow stage 332, first stage output may be provided as module input for second workflow stage 332 for processing to produce second stage output. Processing first stage output may include providing first module output 308 and second module output 310 to both the third computational module 312 and the fourth computational module 314. At the second workflow stage, the third set of operations may be performed on the first module output 308 to produce third module output 316 (labelled as 'D$_3$'). The third set of operations may be performed on the second module output 310 to produce fourth module output 320 (labelled as 'D$_4$'). The fourth set operations may be performed on the first module output 308 to produce the fifth module output 322 (labelled as 'D$_5$'). The fourth set of operations may be performed on the second module output 310 to produce the sixth module output (labelled as 'D$_6$'). The second stage output may include third module output 316, fourth module output 320, fifth module output 322, sixth module output 324, and/or other module outputs.

Figure 4:
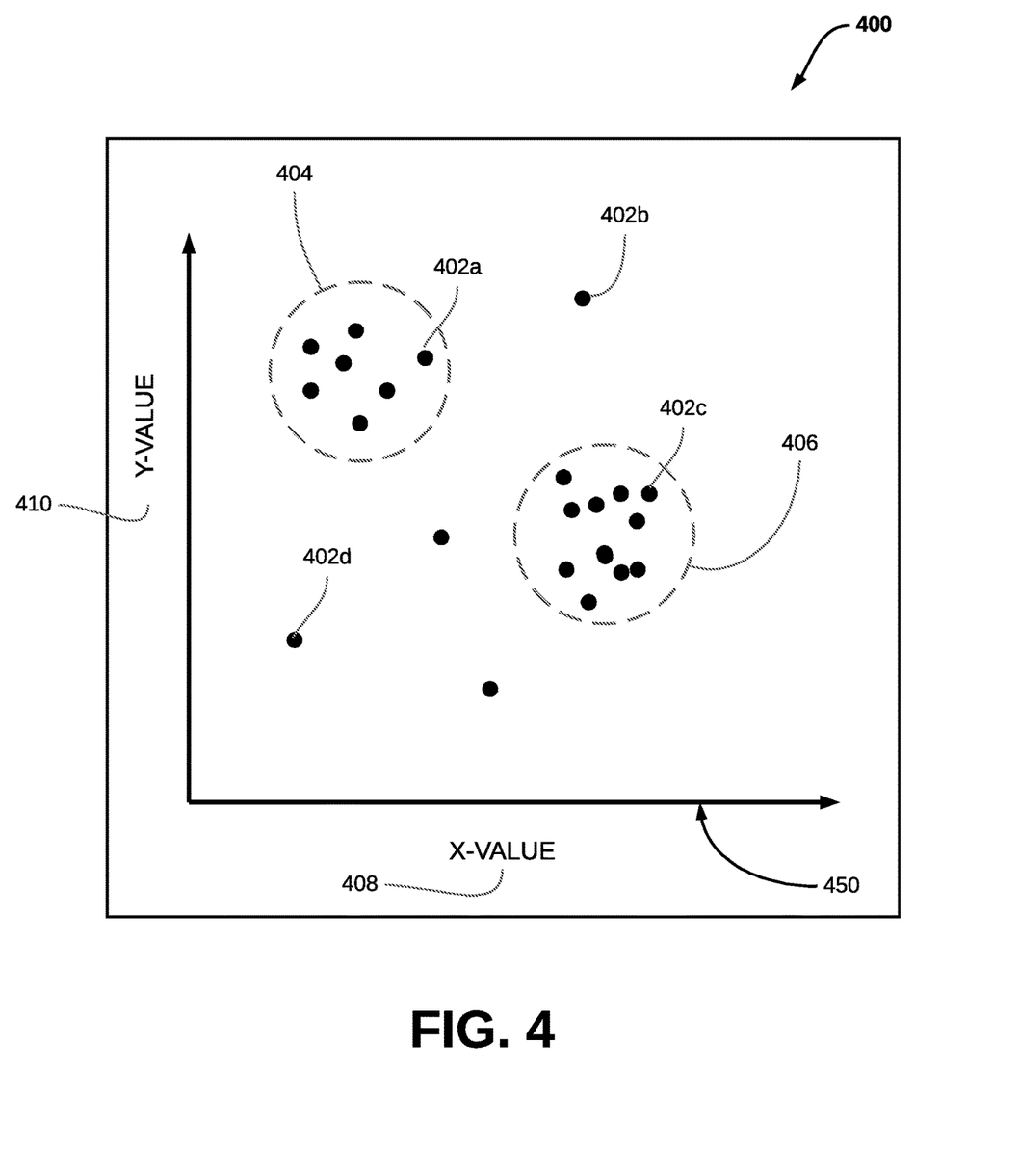
FIG. 4 illustrates an exemplary user interface of the system configured for parallel processing of computational modules of a computational workflow, in accordance with one or more implementations.

FIG. 4 shows an exemplary user interface 400 that may be used by system 100, in accordance with one or more implementations. User interface 400 may display a graphical summary 450 of one or more multiple prospective final outputs for a computational workflow. Individual ones of the multiple prospective final outputs may be represented by a plot 402a-d on graphical summary 450. It should be noted that while graphical summary 450 is shown as a scatterplot, this is not intended to be limiting. Graphical summary 450 may include the plots 402a-d representing individual prospective final outputs based on one or more values of features associated with the individual prospective final output. For example, a first value of a first feature 408 (represented by "X-VALUE") and a second value of a second feature 410 (represented by "Y-VALUE) may determine the position for an individual plot 402a-d on graphical summary 450. In some implementations, graphical summary 450 may include one or more indications of clusters. For example, a first cluster indicator 404 (shown as a dashed circle) may indicate a first cluster of prospective final outputs having similar values for the first feature 408 and/or similar values for the second feature 410. A second cluster indicator 406 (shown as a dashed circle) may indicate a second cluster of prospective final outputs having similar values for the first feature 408 and/or similar values for the second feature 410. Individual plots 402a-d representing individual ones of the multiple prospective final outputs may be selectable via graphical summary 450. Selection of one or more of the individual plots 402a-d may facilitate providing the multiple prospective final outputs as final output for the computational workflow.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 126, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
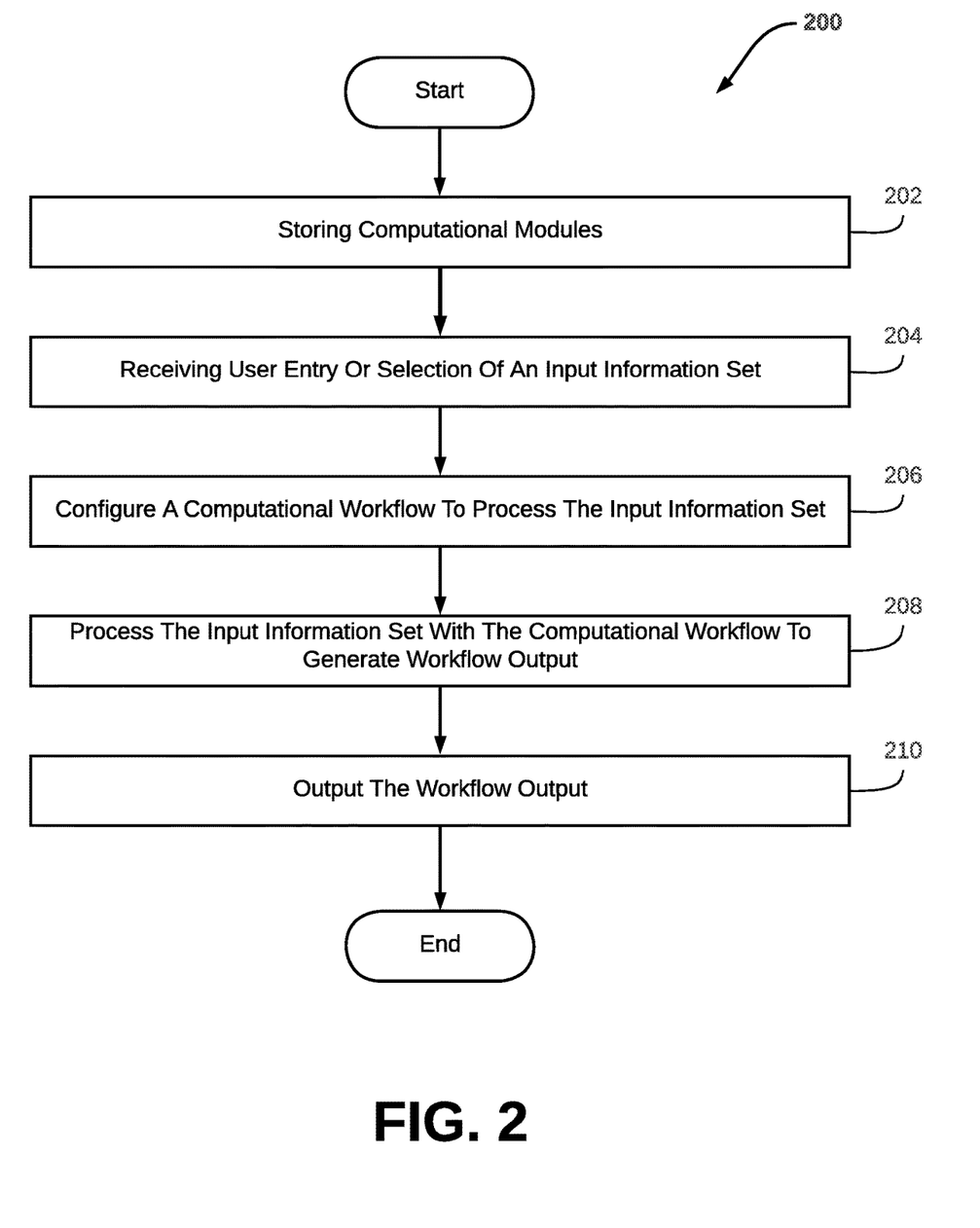
FIG. 2 illustrates a method for parallel processing of computational modules of a computational workflow, in accordance with one or more implementations.

FIG. 2 illustrates a method 200 for parallel processing of computational modules of a computational workflow, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing computational modules and/or other information. Individual ones of the computational modules may define separate sets of computational operations to perform on module inputs to the computational modules to produce module outputs. The different computational modules may have different input format requirements for module inputs. The separate sets of computational operations defined by the different computational modules may produce module outputs having different output formats. By way of non-limiting example, the computational modules may include a first set of computational modules that are functionally analogous to each other, a second set of computational modules that are functionally analogous to each other, and/or other sets of computational modules. The first set of computational modules may include a first computational module, a second computational module, and/or other computational modules. The second set of computational modules may include a third computational module, a fourth computational module, and/or other computational modules. Operation 202 may be performed by electronic storage that is the same as or similar to electronic storage 128, in accordance with one or more implementations.

An operation 204 may include receiving user entry and/or selection of an input information set and/or other information. Operation 204 may be performed by one or more hardware processors configured by machine-readable instructions including a component that is the same as or similar to input component 108, in accordance with one or more implementations.

An operation 206 may include configuring a computational workflow to process the input information set. By way of non-limiting illustration, the computational workflow may have at least a first workflow stage, a second workflow stage, and/or other workflow stages. The second workflow stage may be subsequent to the first workflow stage. The first workflow stage may include the first computational module, the second computational module, and/or other computational modules. The second workflow stage may include the third computational module, the fourth computational module, and/or other computational modules. Operation 206 may be performed by one or more hardware processors configured by machine-readable instructions including a component that is the same as or similar to workflow component 110, in accordance with one or more implementations.

An operation 208 may include processing the input information set with the computational workflow to generate workflow output. Processing the input information set may generate a first stage output, and/or other outputs. Processing the input information set may include providing the input information set, information derived from the input information set, and/or other information to both the first computational module and the second computational module as module input. The first stage output may include a first module output generated by the first computational module, second module output generated by the second computational module, and/or other outputs. At the second workflow stage, operation 208 may include processing the first stage output, information derived from the first stage output, and/or other information to generate a second stage output. Processing at the second workflow stage may include providing the first module output, information derived from the first module output, and/or other information as module input to the third computational module and the fourth computational module. The second stage output may include a third module output generated by the third computational module, a fourth module output generated by the fourth computational module and/or other outputs. Processing at the second workflow stage may further include providing the second module output, information derived from the second module output, and/or other information as module input to the third computational module and the fourth computational module. The second stage output may further include a fifth module output generated by the third computational module, a sixth module output generated by the fourth computational module, and/or other outputs. The workflow output may include separate sets of analogous output information, and/or other information. The separate sets of analogous output may reflect the parallel nature of computation provided by the computational workflow. The separate sets of analogous output information may include a first set of output information, a second set of output information, a third set of output information, a fourth set of output information, and/or other information. The first set of output information may include the third module output, and/or information derived therefrom. The second set of output information may include the fourth module output, and/or information derived therefrom. The third set of output information may include the fifth module output, and/or information derived therefrom. The fourth set of output information including the sixth module output, and/or information derived therefrom. Operation 208 may be performed by one or more hardware processors configured by machine-readable instructions including a component that is the same as or similar to workflow component 110, in accordance with one or more implementations.

An operation 210 may include outputting the workflow output. The separate sets of analogous output information may be presented as multiple prospective final outputs for the processing of the input information set in accordance with the computational workflow. Operation 210 may be performed by one or more hardware processors configured by machine-readable instructions including a component that is the same as or similar to output component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system for parallel processing of computational modules of a computational workflow for processing genomic information, the system comprising:

electronic storage configured to store computational modules, wherein individual ones of the computational modules define separate sets of computational operations to perform on module inputs to the computational modules to produce module outputs, the different computational modules having different input format requirements for module inputs, and the separate sets of computational operations defined by the different computational modules produce module outputs having different output formats, wherein the computational modules include a first set of computational modules that are functionally analogous to each other, and a second set of computational modules that are functionally analogous to each other, the first set of computational modules including a first computational module and a second computational module, the second set of computational modules including a third computational module and a fourth computational module;

one or more physical processors configured by the machine-readable instructions to:
  receive user entry or selection of an input information set that includes the genomic information;
  configure a computational workflow to process the input information set, the computational workflow having at least a first workflow stage and a second workflow stage that is subsequent in the workflow to the first workflow stage, the first workflow stage including the first computational module and the second computational module, and the second workflow stage including the third computational module and the fourth computational module;
  process the input information set with the computational workflow to generate workflow output such that:
    at the first workflow stage, processing the input information set to generate a first stage output, wherein such processing includes providing the input information set, or information derived from the input information set, to both the first computational module and the second computational module as module input so that the first stage output includes both a first module output generated by the first computational module and a second module output generated by the second computational module, wherein the first module output is functionally analogous to the second module output such that the first and second module outputs are interchangeable for use as module inputs at the second workflow stage;
    at the second workflow stage, processing the first stage output, or information derived from the first stage output, to generate a second stage output, wherein such processing includes
      (i) providing the first module output, or information derived from the first module output, as module input to both the third computational module and the fourth computational module so that the second stage output includes a third module output generated by the third computational module and a fourth module output generated by the fourth computational module, and (ii) providing the second module output, or information derived from the second module output, as module input to both the third computational module and the fourth computational module so that the second stage output further includes a fifth module output generated by the third computational module and a sixth module output generated by the fourth computational module;

wherein the workflow output includes separate sets of analogous output information that reflect the parallel nature of computation provided by the computational workflow, the separate sets of analogous output information including a first set of output information, a second set of output information, a third set of output information, and a fourth set of output information, the first set of output information including the third module output, or information derived therefrom, the second set of output information including the fourth module output, or information derived therefrom, the third set of output information including the fifth module output, or information derived therefrom, and the fourth set of output information including the sixth module output, or information derived therefrom; and output the workflow output such that the separate sets of analogous output information are presented as multiple prospective final outputs for the processing of the input information set in accordance with the computational workflow.

2. The system of claim 1, wherein information derived from the first stage output is generated by modifying the first module output and the second module output to satisfy the input format requirements for module inputs of the second set of computational modules.

3. The system of claim 1, wherein the information derived from the first stage output is generated by aggregating the first module output and the second module output.

4. The system of claim 1, wherein the one or more physical processors are further configured by machine-readable instructions to:

receive user input specifying selection of at least one of the multiple prospective final outputs, wherein the selected output is provided as a single final output for the computational workflow, and wherein the multiple prospective final outputs are functionally analogous to each other such that the multiple prospective final outputs are interchangeable as the single final output for the computational workflow.

5. The system of claim 4, wherein multiple user inputs specifying selection of final outputs and the corresponding multiple computational workflows are provided as input-output pairs to train a machine learning model to select a particular final output from a particular set of multiple prospective final outputs for a particular computational workflow, and wherein the machine learning model is stored in the electronic storage media.

6. The system of claim 5, wherein the one or more physical processors are further configured by machine-readable instructions to:

obtain the trained machine learning model from electronic storage and execute selection of at least one of the multiple prospective final outputs as the single final output of the computational workflow using the trained machine learning model.

7. The system of claim 1, wherein the one or more physical processors are further configured by machine-readable instructions to:

analyze the workflow output, wherein analyzing the workflow output includes determining distribution scores for individual ones of the separate sets of analogous output, wherein the distribution scores indicate a relationship between the set of analogous output associated with the distribution score and other sets of analogous output.

8. The system of claim 7, wherein the one or more physical processors are further configured by machine-readable instructions to:

present, via a user interface, a graphical summary of information characterizing the multiple prospective final outputs, including the distribution scores for individual ones of the separate sets of analogous output.

9. The system of claim 1, wherein the second workflow stage is initiated subsequent to completion of the processing of the input information set at the first workflow stage.

10. A system for parallel processing of computational modules of a computational workflow that is used to determine genomic sequences, the system comprising:

electronic storage configured to store computational modules and a workflow definition, wherein individual ones of the computational modules define separate sets of computational operations to perform on module inputs to the computational modules to produce module outputs, the workflow definition including multiple stages and an order of processing through the stages, wherein multiple ones of the stages are parallel stages, and wherein a given parallel stage includes multiple computational modules that are functionally analogous such that the given parallel stage generates multiple stage outputs that correspond to the multiple computational modules included in the given stage, wherein the multiple stage outputs are functionally analogous to each other such that a manufacturing process based on the computational workflow produces the same one or more compounds for any of the multiple stage outputs;

one or more physical processors configured by the machine-readable instructions to:

receive user entry or selection of an input information set that includes genomic information;

process the input information set with the computational workflow in accordance with the workflow definition, wherein such processing generates multiple sets of analogous output information due to the parallelization of processing caused by the inclusion of multiple computational modules in the multiple parallel stages included in the computational workflow; and output the multiple sets of analogous output information as multiple prospective final outputs for the processing of the input information set in accordance with the computational workflow.

11. A method for parallel processing of computational modules of a computational workflow for processing genomic information, the method comprising:

storing computational modules, wherein individual ones of the computational modules define separate sets of computational operations to perform on module inputs to the computational modules to produce module outputs, the different computational modules having different input format requirements for module inputs, and the separate sets of computational operations defined by the different computational modules produce module outputs having different output formats, wherein the computational modules include a first set of computational modules that are functionally analogous to each other, and a second set of computational modules that are functionally analogous to each other, the first set of computational modules including a first computational module and a second computational module, the second set of computational modules including a third computational module and a fourth computational module;

receiving user entry or selection of an input information set that includes the genomic information;

configuring a computational workflow to process the input information set, the computational workflow having at least a first workflow stage and a second workflow stage that is subsequent in the workflow to the first workflow stage, the first workflow stage including the first computational module and the second computational module, and the second workflow stage including the third computational module and the fourth computational module;

processing the input information set with the computational workflow to generate workflow output such that:
at the first workflow stage, processing the input information set to generate a first stage output, wherein such processing includes providing the input information set, or information derived from the input information set, to both the first computational module and the second computational module as module input so that the first stage output includes both a first module output generated by the first computational module and a second module output generated by the second computational module, wherein the first module output is functionally analogous to the second module output such that the first and second module outputs are interchangeable for use as module inputs at the second workflow stage;

at the second workflow stage, processing the first stage output, or information derived from the first stage output, to generate a second stage output, wherein such processing includes
(i) providing the first module output, or information derived from the first module output, as module input to both the third computational module and the fourth computational module so that the second stage output includes a third module output generated by the third computational module and a fourth module output generated by the fourth computational module, and
(ii) providing the second module output, or information derived from the second module output, as module input to both the third computational module and the fourth computational module so that the second stage output further includes a fifth module output generated by the third computational module and a sixth module output generated by the fourth computational module;

wherein the workflow output includes separate sets of analogous output information that reflect the parallel nature of computation provided by the computational workflow, the separate sets of analogous output information including a first set of output information, a second set of output information, a third set of output information, and a fourth set of output information, the first set of output information including the third module output, or information derived therefrom, the second set of output information including the fourth module output, or information derived therefrom, the third set of output information including the fifth module output, or information derived therefrom, and the fourth set of output information including the sixth module output, or information derived therefrom; and outputting the workflow output such that the separate sets of analogous output information are presented as multiple prospective final outputs for the processing of the input information set in accordance with the computational workflow.

12. The method of claim 11, wherein information derived from the first stage output is generated by modifying the first module output and the second module output to satisfy the input format requirements for module inputs of the second set of computational modules.

13. The method of claim 11, wherein the information derived from the first stage output is generated by aggregating the first module output and the second module output.

14. The method of claim 11, wherein the method further includes:
receiving user input specifying selection of at least one of the multiple prospective final outputs, wherein the selected output is provided as a single final output for the computational workflow, and wherein the multiple prospective final outputs are functionally analogous to each other such that the multiple prospective final outputs are interchangeable as the single final output for the computational workflow.

15. The method of claim 14, wherein multiple user inputs specifying selection of final outputs and the corresponding multiple computational workflows are provided as input-output pairs to train a machine learning model to select a particular final output from a particular set of multiple prospective final outputs for a particular computational workflow, and wherein the machine learning model is stored in the electronic storage media.

16. The method of claim 15, wherein the method further includes:
obtaining the trained machine learning model from electronic storage and executing selection of at least one of the multiple prospective final outputs as the single final output of the computational workflow using the trained machine learning model.

17. The method of claim 11, wherein the method further includes:
analyzing the workflow output, wherein analyzing the workflow output includes determining distribution scores for individual ones of the separate sets of analogous output, wherein the distribution scores indicate a relationship between the set of analogous output associated with the distribution score and other sets of analogous output.

18. The method of claim 17, wherein the method further includes:
presenting, via a user interface, a graphical summary of information characterizing the multiple prospective final outputs, including the distribution scores for individual ones of the separate sets of analogous output.

19. The method of claim 11, wherein the second workflow stage is initiated subsequent to completion of the processing of the input information set at the first workflow stage.

20. A method for parallel processing of computational modules of a computational workflow that is used to determine genomic sequences, the method comprising:
storing computational modules and a workflow definition, wherein individual ones of the computational modules define separate sets of computational operations to perform on module inputs to the computational modules to produce module outputs, the workflow definition including multiple stages and an order of processing through the stages, wherein multiple ones of the stages are parallel stages, and wherein a given parallel stage includes multiple computational modules that are functionally analogous such that the given parallel stage generates multiple stage outputs that correspond to the multiple computational modules included in the given stage, wherein the multiple stage outputs are functionally analogous to each other such that a manufacturing process based on the computational workflow produces the same one or more compounds for any of the multiple stage outputs;

receiving user entry or selection of an input information set that includes genomic information;

processing the input information set with the computational workflow in accordance with the workflow definition, wherein such processing generates multiple sets of analogous output information due to the parallelization of processing caused by the inclusion of multiple computational modules in the multiple parallel stages included in the computational workflow; and outputting the multiple sets of analogous output information as multiple prospective final outputs for the processing of the input information set in accordance with the computational workflow.

* * * * *